United States Patent [19]
Graf

[11] Patent Number: 4,951,462
[45] Date of Patent: Aug. 28, 1990

[54] HYDROSTATIC TRANSMISSION WITH MOTOR START CONTROL SYSTEM

[75] Inventor: Kevin J. Graf, Eden Prairie, Minn.

[73] Assignee: Eaton Corporation, Cleveland, Ohio

[21] Appl. No.: 361,516

[22] Filed: Jun. 5, 1989

[51] Int. Cl.$^5$ ............................................. F16H 61/42
[52] U.S. Cl. ......................................... 60/444; 60/491
[58] Field of Search ................. 60/443, 444, 445, 488, 60/490, 491, 492, 911

[56] References Cited

U.S. PATENT DOCUMENTS

| | | | |
|---|---|---|---|
| 2,395,980 | 3/1946 | Wahlmark | 60/389 |
| 3,107,490 | 10/1963 | Cooper et al. | 60/443 |
| 3,901,031 | 8/1975 | Knapp et al. | 60/395 |
| 4,091,617 | 5/1978 | Cornell | 60/445 |
| 4,167,855 | 9/1979 | Knapp | 60/445 |
| 4,341,133 | 7/1982 | Sakamoto | 60/444 X |
| 4,461,147 | 7/1984 | Myers | 60/444 X |

Primary Examiner—Edward K. Look
Assistant Examiner—George Kapsalas
Attorney, Agent, or Firm—L. J. Kasper

[57] ABSTRACT

A closed-loop hydrostatic transmission is disclosed of the type with a fluid pump (10) and a fluid motor (12), both of which are variable displacement. A pair of stroking cylinders (36,38) varies the displacement of the motor between minimum displacement and maximum displacement, under the control of a motor stroking valve (70) which includes a stroking valve member (90) movable in response to changes in fluid pressure in a pressure chamber (110). The displacement of the pump is controlled by a main controller (50) in response to movement of an input handle (60). Whenever the handle (60) is moved to the neutral position, a neutral switch (122) is closed, thus generating a neutral signal which is transmitted to an electromagnetic valve member (114), which controls the pressure in the fluid pressure chamber (110) to command the motor to maximum displacement. With the motor at maximum displacement, subsequent movement of the handle (60) away from the neutral position, to begin to propel the vehicle, results in a smoother start-up of the vehicle because the motor is at maximum displacement (a high-torque, low-speed condition). Starting the vehicle with the motor at maximum displacement also reduces the amount of rise of system pressure above the relief valve setting, thus reducing the amount of heat generated and the amount of horsepower wasted.

14 Claims, 4 Drawing Sheets

HYDROSTATIC TRANSMISSION WITH MOTOR START CONTROL SYSTEM

BACKGROUND OF THE DISCLOSURE

The present invention relates to hydrostatic transmissions and control systems therefor, and more particularly, to such transmissions including both a variable displacement pump and a variable displacement motor.

Although the present invention may be used with any transmission of the general type referred to above, it is especially advantageous when used with a variable motor which is controlled by a motor stroking valve such as that shown in U.S. Pat. No. 4,091,617, assigned to the assignee of the present invention, and incorporated herein by reference. The above-incorporated patent illustrates an electromagnetically operated valve to control pump displacement, but a substantially identical valve is now sold commercially by the assignee of the present invention as a motor stroking valve.

One of the primary applications for hydrostatic transmissions in which both the pump and motor are variable displacement is to propel vehicles, such as construction vehicles, which stop and start frequently, and are often subjected to heavy loads. On such vehicles, operation with the motor at maximum displacement provides a high-torque, low-speed mode for handling loads, while operation with the motor at minimum displacement provides a high-speed, low-torque mode, such as when the vehicle is being transported from one location to another.

In transmissions and control systems of the type to which the invention relates, when the main pump controller is put in neutral position, and the vehicle comes to a stop, the motor stroking valve senses relatively low system pressure and destrokes to minimum motor displacement. Upon subsequent start-up of the vehicle, by moving the pump controller away from neutral, the system pressure rises to a relatively high pressure, which indirectly acts on the motor swashplate to gradually move it to the maximum displacement position, which typically requires several seconds until the motor is at maximum displacement. As this is occurring, the system pressure normally rises above the relief valve setting for a short time, thus generating a substantial amount of heat and wasting substantial engine horsepower.

SUMMARY OF THE INVENTION

Accordingly, it is an object of the present invention to provide an improved hydrostatic transmission and control system therefor, of the type having no mechanical linkage between the pump controller and the motor stroking valve, wherein, after each time the pump controller has been moved to the neutral position, the motor is commanded to maximum displacement to provide for maximum motor torque upon subsequent movement of the pump controller away from neutral.

The above and other objects of the present invention are accomplished by the provision of an improved closed-loop hydrostatic transmission of the type including a variable displacement pump, a variable displacement motor, and conduit means interconnecting the pump and motor. A first fluid operable means varies the displacement of the pump between a neutral position and an operating position, and a second fluid operable means varies the displacement of the motor between a first, relatively lesser displacement and a second, relatively greater displacement. A source of pressurized control fluid provides for operation of the first and second fluid operable means. A main control means is operable to communicate the pressurized control fluid to the first fluid operable means in response to movement of an input. A motor stroking valve means is operable to communicate the pressurized control fluid to the second fluid operable means, the motor stroking valve means including a stroking valve member movable, in response to first and second pressures in a fluid pressure chamber, between a first position in which the control fluid is communicated to the second fluid operable means to command the first displacement of the motor, and a second position in which the control fluid is communicated to the second fluid operable means to command the second displacement of the motor. The motor stroking valve means further includes a valve member operable between first and second positions to control the pressure in the fluid pressure chamber between the first and second pressures, respectively.

The improved transmission is characterized by means operable to sense the input and to generate a neutral signal when the input corresponds to the neutral position of the variable displacement pump. The transmission is further characterized by means operable to transmit the neutral signal to the valve member, to operate the valve member in the second position, whereby the motor is commanded to the second, relatively greater displacement when the pump is in the neutral position.

DESCRIPTION OF THE PREFERRED EMBODIMENT

Figure 1:
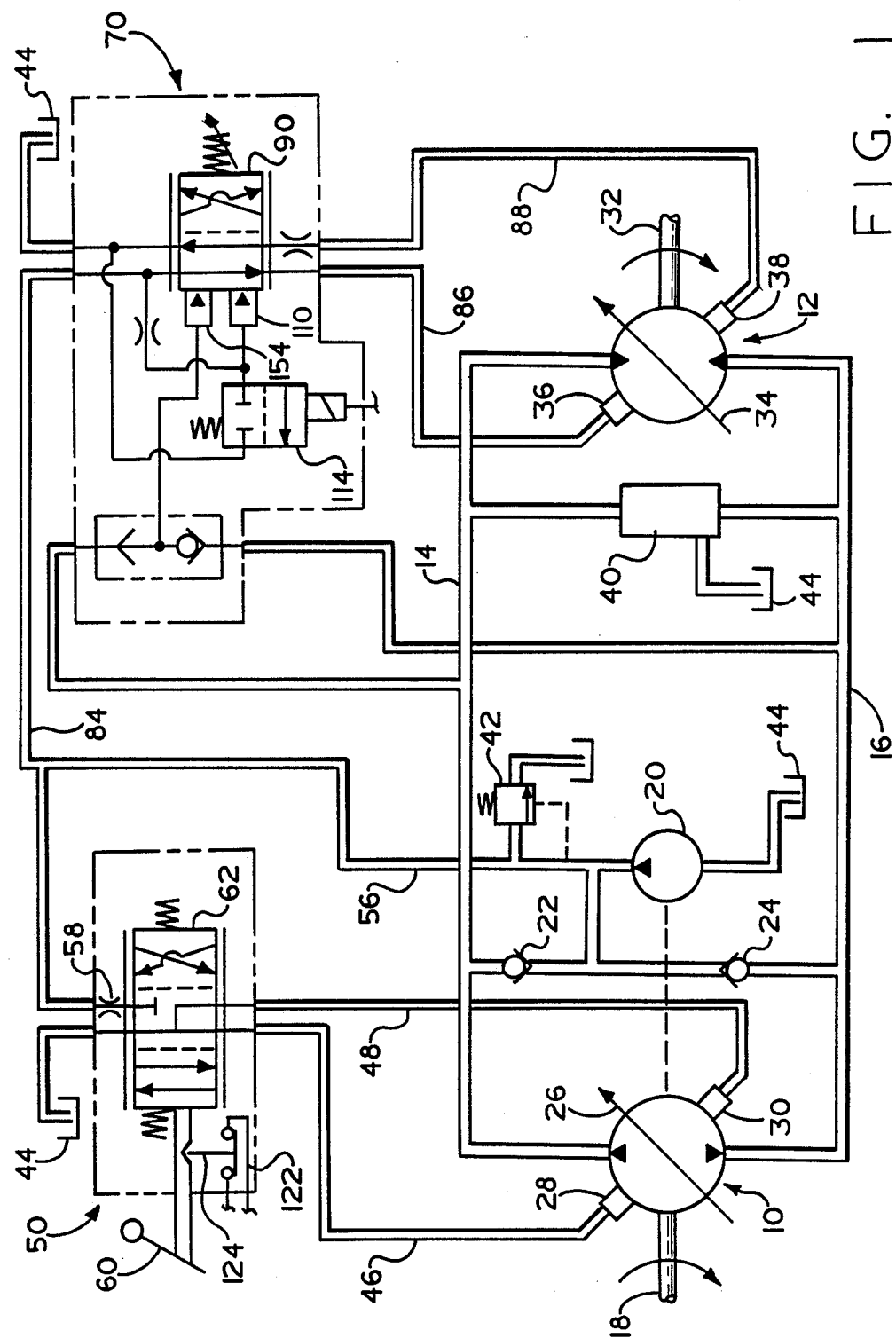
FIG. 1 is a hydraulic schematic of a hydrostatic transmission and control system made in accordance with the present invention.

Referring now to the drawings, which are not intended to limit the invention, FIG. 1 illustrates a hydrostatic transmission of the type which is well known, and sold commercially by the assignee of the present invention. The transmission and control system of FIG. 1 includes a variable displacement, swashplate-type, axial piston pump 10 hydraulically coupled to a variable displacement, swashplate-type, axial piston motor 12 by means of hydraulic conduits 14 and 16. Pump 10 is of a well known type, and includes an input shaft 18 which receives input drive torque from a prime mover (not shown). The input shaft 18 drives the rotating group of the pump 10 in a manner well known in the art, and also drives a charge pump 20. The charge pump 20 is hydraulically coupled by means of check valves 22 and 24, respectively, to conduits 14 and 16. Pump 10 further includes a swashplate 26 which is movable over-center by means of a pair of stroking cylinders 28 and 30.

Similarly, the motor 12 (shown in greater detail in FIG. 3) includes an output shaft 32, which is typically coupled to an output device such as a vehicle drive wheel, or a vehicle auxiliary device. The motor 12 further includes a swashplate 34 which is movable from a minimum displacement position to a maximum displacement position by means of a pair of stroking cylinders 36 and 38, in a manner which is well known to those skilled in the art.

Hydraulically coupled in parallel with the motor 12 is a known control mechanism 40 which typically includes a shuttle valve, high pressure relief valves, and a charge pressure relief valve. A charge pump relief valve 42 is coupled to the output of the charge pump 20. The pump 10, the motor 12, and the charge pump 20 are all in hydraulic communication with a system reservoir 44.

The pump stroking cylinders 28 and 30 are coupled by means of conduits 46 and 48, respectively, to a manual servo control valve, generally designated 50, also typically referred to as a manual controller. The controller 50 will be described in greater detail in connection with FIG. 2.

Figure 2:
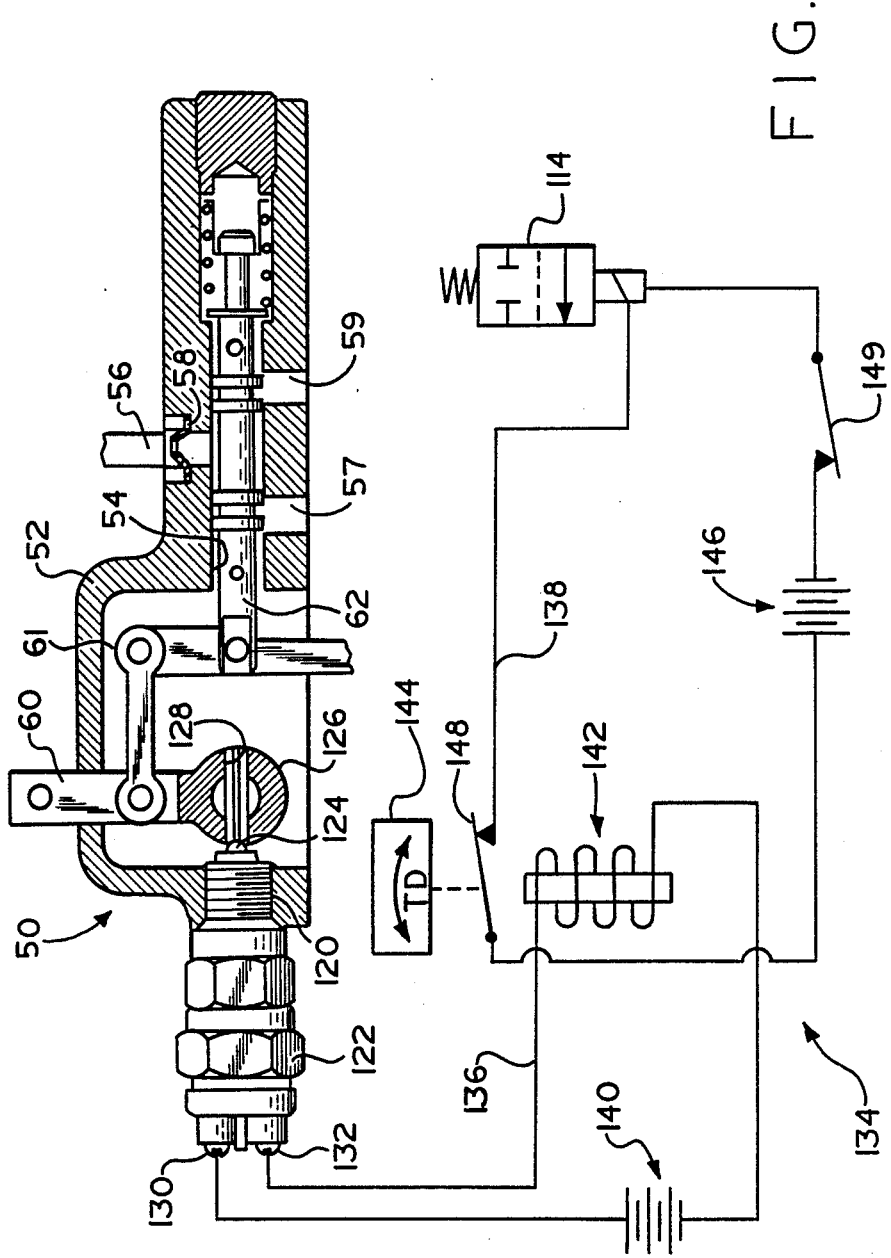
FIG. 2 is an axial cross-section of the manual controller shown schematically in FIG. 1, and including an electrical schematic of part of the control system of the present invention.

Referring now primarily to FIG. 2, the manual controller 50 is generally well known in the art, is described in above-incorporated U.S. Pat. No. 4,091,617 and will be described only briefly hereinafter. The manual controller 50 includes a valve housing 52, which defines a spool bore 54, the ends of which are in open communication with the system reservoir 44. The central portion of the spool bore 54 is in communication with the output of the charge pump 20 by means of a conduit 56, with the control fluid from the charge pump 20 flowing through a restriction orifice 58. The housing 52 also defines a pair of fluid passages 57 and 59 which provide communication between the spool bore 54 and the conduits 46 and 48, respectively.

The manual controller 50 further includes a manual control handle or lever 60 and linkage 61 connecting the handle 60 to a valve spool 62, and to the swashplate 26. As is well known to those skilled in the art, the function of the linkage is to center the valve spool 62 in its centered position shown in FIG. 2 whenever the position of the swashplate 26 matches the desired position as set by the control lever 60.

Figure 3:
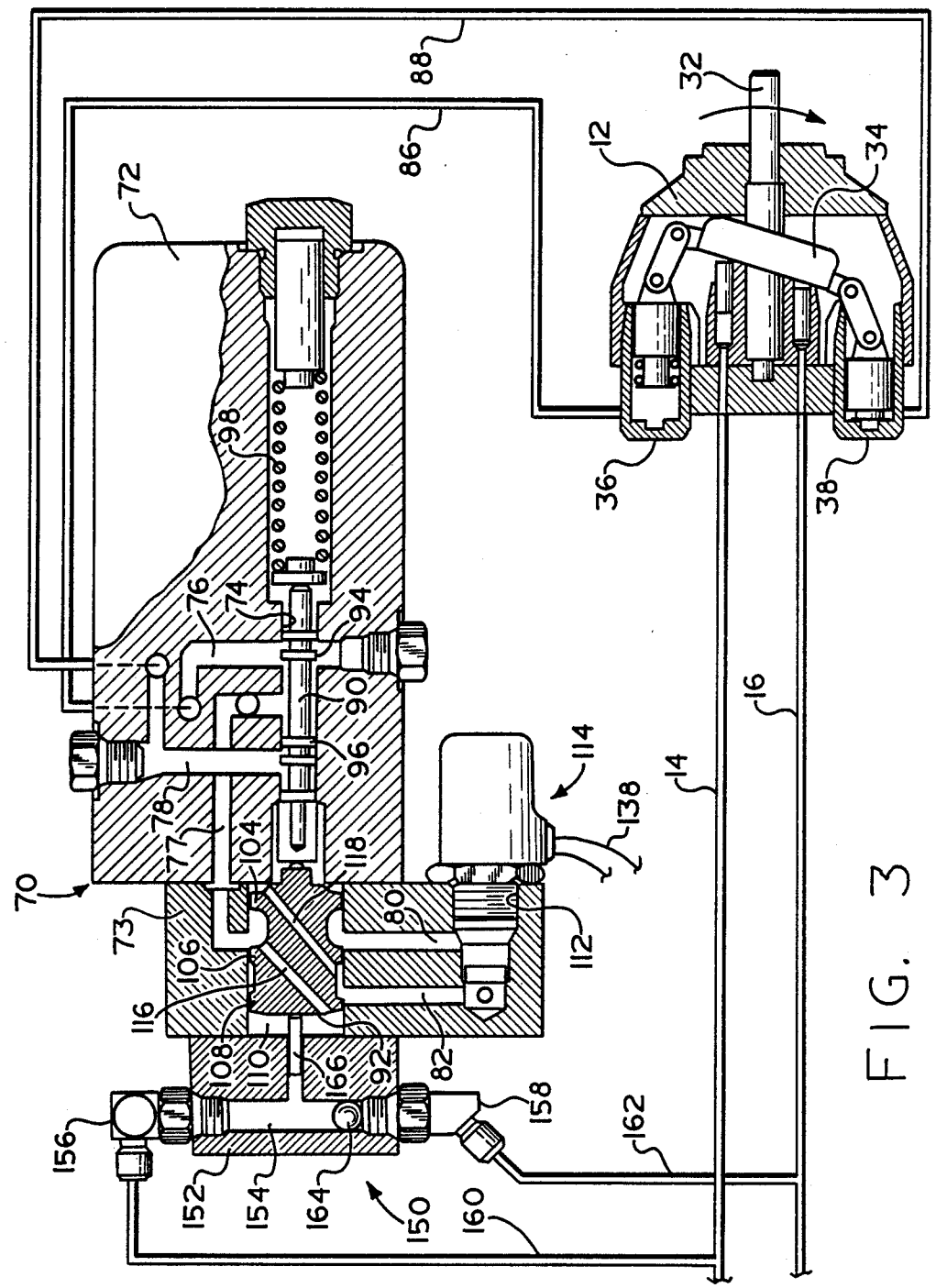
FIG. 3 is an axial cross-section of the motor stroking control shown schematically in FIG. 1, including a somewhat schematic of the variable displacement motor shown in FIG. 1.

Referring now to FIG. 3, in conjunction with FIG. 1, there is illustrated in some detail a motor stroking and pressure response control, generally designated 70, which is shown schematically in FIG. 1. The control 70 includes a housing 72 defining a multi-stepped bore, generally designated 74, and a housing 73 defining an enlarged portion of the bore 74. Axially spaced passages 76, 77, and 78 intersect the bore 74, and a pair of axially spaced passages 80 and 82 communicate with the enlarged portion of the bore 74. Passage 77 receives pressurized fluid from the charge pump 20 by means of a conduit 84 (see FIG. 1) which is in communication with the conduit 56. The passage 76 is in fluid communication with the stroking cylinder 36 by means of a conduit 86, while the passage 78 is in fluid communication with the stroking cylinder 38 by means of a conduit 88.

Disposed within the smaller portion of the bore 74 is a valve spool 90, and disposed within the larger portion of the bore 74 is a valve spool 92. The valve spool 90 includes a pair of lands 94, and a pair of lands 96. The lands 94 block the flow of fluid into a somewhat enlarged portion of the bore 74 which houses an adjustable spring 98, which biases the valve spool 90 toward a position permitting communication of control fluid from the passage 77 to the passage 78. The passage 78 communicates with the stroking cylinder 38 by means of the conduit 88, as was described previously. When the valve spool 90 is biased to the right in FIG. 3, in opposition to the force of the spring 98, the valve spool moves to a position which permits communication of control fluid from the passage 77 to the passage 76, the passage 76 communicating with the stroking cylinder 36 by means of the conduit 86, as was also described previously. The means by which the valve spool 90 is biased to the right in FIG. 3 will now be described further.

The valve spool 92 includes lands 104, 106, and 108. In all operating positions, the land 104 separates the passage 77 from the chamber adjacent the right end of the valve spool 92, which is in communication with the system reservoir 44. Also, in all operating positions, the land 106 separates the passage 77 from the passage 82, and the land 108 separates the passage 82 from a chamber 110 disposed adjacent the left end of the valve spool 92.

The housing 73 defines a stepped bore 112 in which is disposed an electromagnetic valve 114 (shown schematically in FIG. 1), which may preferably be of the on/off type. In the unactuated ("off") position (as shown in FIG. 1), the valve 114 blocks communication between the passages 80 and 82. When this occurs, pressurized control fluid flows from the passage 77 through an angled passage 116, defined by the valve spool 92, into the chamber 110. Control pressure in the chamber 110 biases the valve spool 92 and the valve spool 90 to the positions shown in FIG. 3, resulting in communication of control pressure from the passage 77 through the passage 76 and the conduit 86 to the stroking cylinder 36, thereby moving the swashplate 34 to the maximum displacement position which, in the subject embodiment, is approximately eighteen degrees of displacement, as is shown in FIG. 3, and is well known to those skilled in the art.

If the electromagnetic valve 114 is in the actuated ("on") position, communication is permitted between the passages 80 and 82, with the passage 82 being in open communication by means of an angled passage 118 with the right end of the valve spool 92. Therefore, with the valve 114 in the "on" position, control pressure in chamber 110 flows through angled passage 116 into passage 80, past a poppet portion of the electromagnetic valve 114, then through passage 82 and angled passage 118 to the reservoir, thereby resulting in approximately reservoir pressure in the chamber 110, such that the spring 98 biases the valve spools 90 and 92 to the position described previously in which control pressure flows from the passage 77 to the passage 78, then through the conduit 88 to the stroking cylinder 38, biasing the swashplate 34 to the minimum displacement position which, in the subject embodiment, is approximately seven degrees of displacement.

Referring again to FIG. 2, the valve housing 52 includes an internally threaded portion 120 into which is threaded a switch assembly 122. The switch 122 is preferably a normally-closed electrical switch, including a plunger 124, which is normally in engagement with a cylindrical outer surface 126 of the manual control lever 60. The surface 126 defines a cross bore 128 positioned such that when the control lever 60 is moved to its neutral setting as shown in FIG. 2, the left end of the cross bore 128 receives the plunger 124, permitting it to move to the right in FIG. 2, thereby closing the electrical connection between a pair of contacts 130 and 132.

All of the structure which has been described up to this point is generally well known, and is in commercial production.

Referring still to FIG. 2, the improved control of the present invention will now be described. Connected to the contacts 130 and 132, and also connected to the electromagnetic valve 114, is an electrical control circuit, generally designated 134. In accordance with the present invention, the purpose of the circuit 134, which will be described in greater detail subsequently, is to provide an actuation signal to the stroking valve 70 whenever the manual control lever 60 is in its neutral position. The control circuit 134 actually comprises a pair of circuits 136 and 138, which are operatively associated in a manner to be described.

The circuit 136 includes the switch 122, and in series therewith, a source of electrical power shown schematically as a battery 140. Also included in the series circuit 136 is the coil of an electromagnetic relay 142. Preferably, the relay 142 includes an adjustable, time delay control 144. The circuit 138 includes a source of electrical power, illustrated schematically as a battery 146 which is in series with a switch 148, actuated by the relay 142, such that the switch 148 is a normally-closed switch. The electromagnetic valve 114 is in series with the switch 148, such that the valve 114 is normally-closed, blocking flow from passage 80 to passage 82, as was described previously. The circuit 138 also includes a switch 149, which is shown in FIG. 2 in the closed position. The switch 149 may be toggled to the open position to command the motor 12 to remain at maximum displacement, as will become more apparent in the subsequent description.

Referring again to FIG. 3, attached to the housing 73 by any suitable means (not shown), is a shuttle valve assembly, generally designated 150, including a separate housing 152. The housing 152 defines a generally T-shaped passage 154, with the ends thereof receiving hydraulic fittings 156 and 158, which are connected to the conduits 14 and 16, respectively, by a pair of conduits 160 and 162, respectively. Disposed within the vertical portion of the passage 154 is a shuttle ball 164 such that, if the conduit 14 contains system pressure, that pressure is communicated through conduit 160 and fitting 156, to bias the ball 164 to the position shown in FIG. 3. System pressure in the passage 154 acts against the end of a piston 166, pushing it against the valve spool 92, in opposition to the biasing force of the spring 98.

Operation

When a vehicle is equipped with the hydrostatic transmission and control system of the present invention, operation will occur as follows. When the vehicle has stopped as a result of the control handle 60 having been placed in the neutral position, normally the lack of substantial system pressure in either of the conduits 14 or 16 results in low pressure in the passage 154 of shuttle valve 150, acting on piston 166, and the spring 98 biases the valve spool 90 to the left in FIG. 3, such that the motor 12 goes to minimum displacement, as was described previously. However, with the control system of the present invention, when the manual control handle 60 is placed in the neutral position shown in FIG. 2, this results in movement of the plunger 124 into the cross bore 128 as described previously, closing the switch between the contacts 130 and 132, and thereby completing the electrical circuit 136. As a result, the coil of the relay 142 is energized, moving the switch 148 to its open position, thereby opening the circuit 138. With the circuit 138 open, the valve 114 is de-energized, moving from its open position to a closed position, blocking communication between passage 80 and passage 82. As was described previously, this results in the chamber 110 receiving control pressure, overcoming the biasing force of the spring 98 to bias the valve spool 90 to the right in FIG. 3, communicating control pressure from passage 77 to passage 76, then through conduit 86 to stroking cylinder 36, thereby driving the swashplate 34 to its maximum displacement position as shown in FIG. 3.

When the control handle 60 is subsequently moved from the neutral position to an operating position, opening the circuit between the contacts 130 and 132, the switch 148 doesn't close instantaneously, because of the time delay 144. Instead, the switch 148 remains open for a brief period of time, as determined by the setting of the adjustable time delay 144, which would typically be set such that the switch 148 would close from about 1 sec. to about 5 sec. after the handle 60 is moved away from neutral. The time delay 144 allows custom tuning of the control system of the present invention, to accommodate the particular vehicle or load inertia. The longer the setting of the time delay 144, the longer the motor 12 will remain at maximum displacement, providing the maximum possible torque for overcoming the inertia of the vehicle and load.

Figure 4:
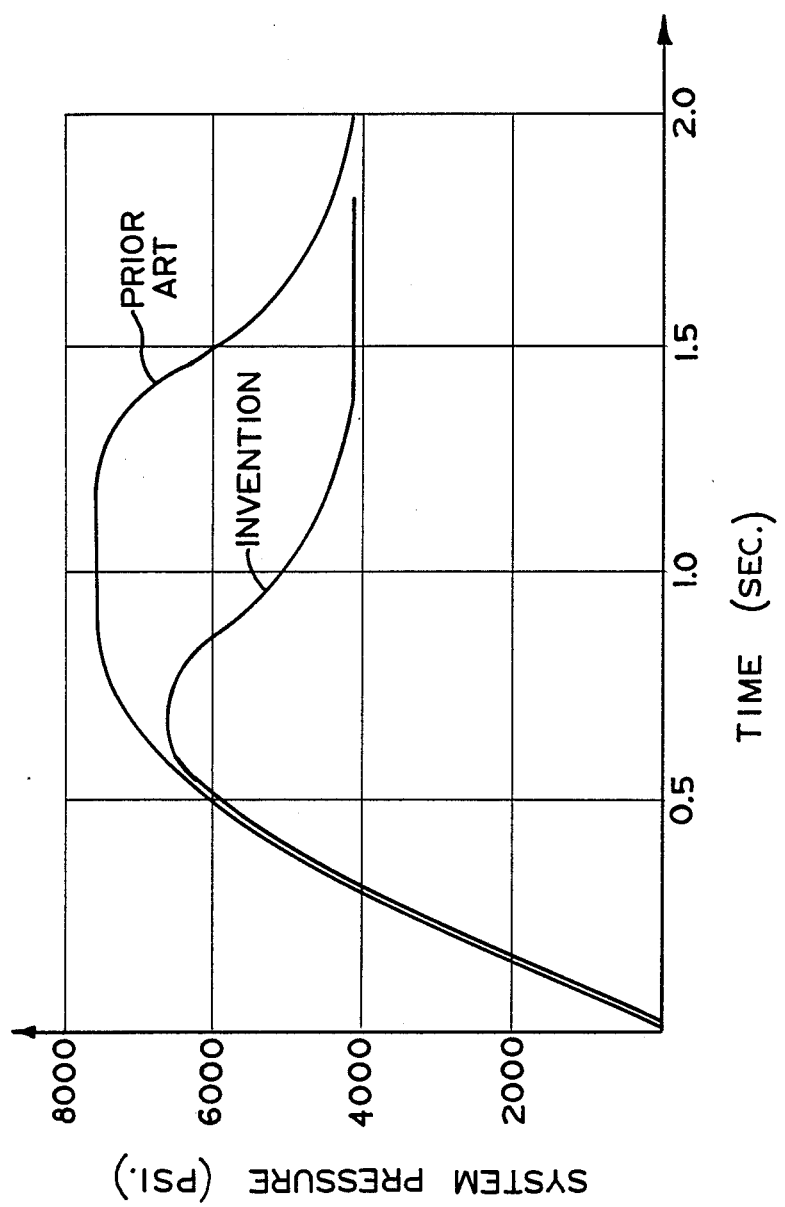
FIG. 4 is a graph of system pressure versus time, comparing the hydrostatic transmission shown in FIG. 1, with and without the present invention.

Referring now to the graph of FIG. 4, the advantages of the control system of the present invention will be described. FIG. 4 is a graph of system pressure (i.e., the pressure in whichever of the conduits 14 or 16 is at higher pressure), versus time. In the subject embodiment, the setting of the relief valves in the control mechanism 40 is 6000 psi. In the transmission without the present invention (labeled "PRIOR ART" in FIG. 4), after the pump has been destroked to neutral, the motor goes to minimum displacement, because system pressure is low, as described previously. Therefore, when the pump is subsequently stroked to some positive displacement, at Time=0.0 sec., system pressure rises rapidly and, at Time=0.5 sec., rises above the relief setting of 6000 psi. in an attempt to overcome the inertia of the vehicle. The pressure remains above the relief setting until approximately Time=1.5 sec., during which time the system pressure is causing the motor to stroke from minimum to maximum displacement. The flow of system pressure over the relief valve represents a substantial waste of engine horsepower, much of which is manifested as undesirable heat.

Referring still to FIG. 4, in the transmission with the present invention (labeled "INVENTION" in FIG. 4), after the pump has been destroked to neutral, the motor is commanded to maximum displacement, as was described previously. Therefore, when the pump is subsequently stroked to some positive displacement, at Time=0.0 sec., system pressure again rises rapidly and, just after Time=0.5 sec., rises somewhat above the relief setting of 6000 psi. However, with the invention, the pressure remains above the relief setting for only about 0.32 sec., or until about Time=0.85 sec. As a result, the amount of flow over the relief valve, and the associated amount of heat generated and horsepower wasted, is greatly reduced.

In addition, with the motor commanded to maximum displacement, the start-up of the vehicle from a stop is much smoother, providing relatively high torque and low speed at first, then gradually decreasing the relative torque and increasing the relative speed, in the same general manner as does a conventional automotive transmission. The practical benefit of starting the vehicle with the motor at maximum displacement (low speed), is illustrated by the test data presented below, giving the time, in seconds, for the transmission output speed (speed of output shaft 32) to go from 0 rpm to 500 rpm, and from 0 rpm to 1000 rpm, comparing the prior art system with the invention.

| Speed | PRIOR ART | INVENTION |
|---|---|---|
| 0 to 500 rpm. | 1.24 sec. | 0.96 sec. |
| 0 to 1000 rpm. | 1.68 sec. | 1.32 sec. |

It will be recognized by those skilled in the art that the ability to reach a certain level of motor output speed in a shorter time is a major advantage when the hydrostatic transmission and control system of the invention are being used to propel a vehicle such as a construction vehicle. In such an application, the vehicle is stopping and starting frequently, and often while being subjected to a substantial load, thus requiring high torque, low speed operation for maximum efficiency.

The invention has been described in great detail, sufficient to enable one skilled in the art to make and use the same. Various alterations and modifications will occur to those skilled in the art, upon a reading and understanding of the foregoing specification, and it is intended to include all such alterations and modifications as part of the invention, insofar as they come within the scope of the appended claims.

I claim:

1. A closed-loop hydrostatic transmission of the type including a prime mover driven variable displacement fluid pump; a variable displacement fluid motor, and conduit means interconnecting said pump and said motor; first fluid operable means for varying the displacement of said pump between a neutral position and an operating position; second fluid operable means for varying the displacement of said motor between a first, relatively lesser displacement and a second, relatively greater displacement; a source of pressurized control fluid for operating said first and second fluid operable means; main control means operable to communicate said pressurized control fluid to said first fluid operable means in response to movement of an input; motor stroking valve means operable to communicate said pressurized control fluid to said second fluid operable means, said motor stroking valve means including a stroking valve member movable, in response to first and second pressures, in a fluid pressure chamber, between a first position in which said control fluid is communicated to said second fluid operable means to command said first displacement of said motor, and a second position in which said control fluid is communicated to said second fluid operable means to command said second displacement of said motor; said motor stroking valve means further including an electromagnetically operated valve member operable between first and second positions to control the pressure in said fluid pressure chamber between said first and second pressures, respectively; characterized by:

(a) means operable to sense said input and to generate a neutral signal when said input corresponds to said neutral position of said variable displacement pump; and (b) means operable to transmit said neutral signal to said electromagnetically operated valve member, to operate said valve member in said second position, whereby said motor is commanded to said second, relatively greater displacement when said pump is in said neutral position.

2. A hydrostatic transmission as claimed in claim 1 characterized by said first, relatively lesser displacement of said fluid motor comprises a substantially minimum displacement, and said second, relatively greater displacement of said fluid motor comprises a substantially maximum displacement.

3. A hydrostatic transmission as claimed in claim 1 characterized by said main control means comprises a valve housing defining a spool bore and first and second passages extending from said spool bore to the exterior of said valve housing, and being in fluid communication with said first fluid operable means, said main control means further comprising a valve spool disposed in said spool bore and operable to control the flow of fluid from said source of pressurized control fluid to said first and second passages, in response to said movement of said input.

4. A hydrostatic transmission as claimed in claim 1 characterized by said motor stroking valve means including spring means biasing said stroking valve member toward said first position, and further including means biasing said stroking valve member toward said second position, said biasing means comprising the fluid pressure in said fluid pressure chamber.

5. A hydrostatic transmission as claimed in claim 4 characterized by said fluid pressure chamber being in fluid communication with said source of pressurized control fluid, said electromagnetically operated valve member being disposed in series flow relationship between said fluid pressure chamber and a source of relatively low pressure fluid, said first position of said electromagnetically operated valve member comprising said valve member permitting relatively unrestricted fluid communication from said fluid pressure chamber to said source of relatively low pressure fluid, and said second position of said electromagnetically operated valve member comprising said valve member blocking fluid communication between said fluid pressure chamber and said source of relatively low pressure fluid,.

6. A hydrostatic transmission as claimed in claim 4 characterized by said biasing means further comprises the fluid pressure in another fluid pressure chamber, said conduit means being in fluid communication with said another fluid pressure chamber through a shuttle valve means, whereby the higher of the fluid pressures in said conduit means biases said stroking valve member toward said second position.

7. A hydrostatic transmission as claimed in claim 1 characterized by said input comprising a manually operable handle means, and said means operable to sense said input comprises an electrical switch and said means to transmit said neutral signal includes a source of electrical power, said switch being operable to generate said neutral signal when said handle means corresponds to said neutral position of said variable displacement pump.

8. A hydrostatic transmission as claimed in claim 1 characterized by said means operable to transmit said neutral signal comprises electric circuit means including time delay circuit means to maintain said electromagnetically operated valve member in said second position for a period of time after said input is moved from a position corresponding to said neutral position of said pump and said means operable to sense said input is no longer generating said neutral signal.

9. A closed-loop hydrostatic transmission of the type including a prime mover driven variable displacement fluid pump; a variable displacement fluid motor, and conduit means interconnecting said pump and said motor; first fluid operable means for varying the displacement of said pump between a neutral position and an operating position; second fluid operable means for varying the displacement of said motor between a first, relatively lesser displacement and a second, relatively greater displacement; a source of pressurized control fluid for operating said first and second fluid operable means; main control means operable to communicate said pressurized control fluid to said first fluid operable means in response to movement of an input; motor stroking valve means operable to communicate said pressurized control fluid to said second fluid operable means, said motor stroking valve means including a stroking valve member movable, in response to first and second pressures, in a fluid pressure chamber, between a first position in which said control fluid is communicated to said second fluid operable means to command said first displacement of said motor, and a second position in which said control fluid is communicated to said second fluid operable means to command said second displacement of said motor; said motor stroking valve means further including a valve member operable between first and second positions to control the pressure in said fluid pressure chamber between said first and second pressures, respectively; characterized by:
  (a) means operable to sense said input and to generate a neutral signal when said input corresponds to said neutral position of said variable displacement pump; and
  (b) means operable to transmit said neutral signal to said valve member, to operate said valve member in said second position, whereby said motor is commanded to said second, relatively greater displacement when said pump is in said neutral position.

10. A hydrostatic transmission as claimed in claim 9 characterized by said first, relatively lesser displacement of said fluid motor comprises a substantially minimum displacement, and said second, relatively greater displacement of said fluid motor comprises a substantially maximum displacement.

11. A hydrostatic transmission as claimed in claim 9 characterized by said main control means comprises a valve housing defining a spool bore and first and second passages extending from said spool bore to the exterior of said valve housing, and being in fluid communication with said first fluid operable means, said main control means further comprising a valve spool disposed in said spool bore and operable to control the flow of fluid from said source of pressurized control fluid to said first and second passages, in response to said movement of said input.

12. A hydrostatic transmission as claimed in claim 9 characterized by said motor stroking valve means including spring means biasing said stroking valve member toward said first position, and further including means biasing said stroking valve member toward said second position, said biasing means comprising the fluid pressure in said fluid pressure chamber.

13. A hydrostatic transmission as claimed in claim 12 characterized by said fluid pressure chamber being in fluid communication with said source of pressurized control fluid, said valve member being disposed in series flow relationship between said fluid pressure chamber and a source of relatively low pressure fluid, said first position of said valve member comprising said valve member permitting relatively unrestricted fluid communication from said fluid pressure chamber to said source of relatively low pressure fluid, and said second position of said valve member comprising said valve member blocking fluid communication between said fluid pressure chamber and said source of relatively low pressure fluid,.

14. A hydrostatic transmission as claimed in claim 12 characterized by said biasing means further comprises the fluid pressure in another fluid pressure chamber, said conduit means being in fluid communication with said another fluid pressure chamber through a shuttle valve means, whereby the higher of the fluid pressures in said conduit means biases said stroking valve member toward said second position.

* * * * *